United States Patent [19]

Seigneur et al.

[11] Patent Number: 4,577,916
[45] Date of Patent: Mar. 25, 1986

[54] FURNITURE FASTENER ASSEMBLY

[76] Inventors: Emile Seigneur, 72 Avenue Herbillon, 94160 Saint Maude; Philippe Paillart, 13, Rue Mercerie, 05100 Briancon, both of France

[21] Appl. No.: 571,844

[22] Filed: Jan. 18, 1984

[30] Foreign Application Priority Data

Jan. 25, 1983 [FR] France ................................. 83 01055

[51] Int. Cl.⁴ ............................................. F16B 12/00
[52] U.S. Cl. .................................. 312/257 R; 312/140
[58] Field of Search ................... 312/111, 257 R, 140; 403/232.1, 403, 231; 16/382, 384, 389, 390

[56] References Cited

U.S. PATENT DOCUMENTS

| 1,141,210 | 6/1915 | Pirson | 403/231 |
| 1,870,132 | 8/1932 | Miller | 403/231 |
| 2,321,391 | 6/1943 | Kamin | 403/403 |
| 3,006,039 | 10/1961 | Brydolf | 16/379 |
| 3,039,568 | 6/1962 | Sherron | 312/111 |
| 3,188,696 | 6/1965 | Earhart | 403/231 |

FOREIGN PATENT DOCUMENTS 193120 2/1923 United Kingdom ................. 16/390

Primary Examiner—Francis K. Zugel
Assistant Examiner—Joseph Falk
Attorney, Agent, or Firm—Kuhn Muller and Bazerman

[57] ABSTRACT

The application discloses an assembly of fasteners used to assemble parts of furniture.

8 Claims, 14 Drawing Figures

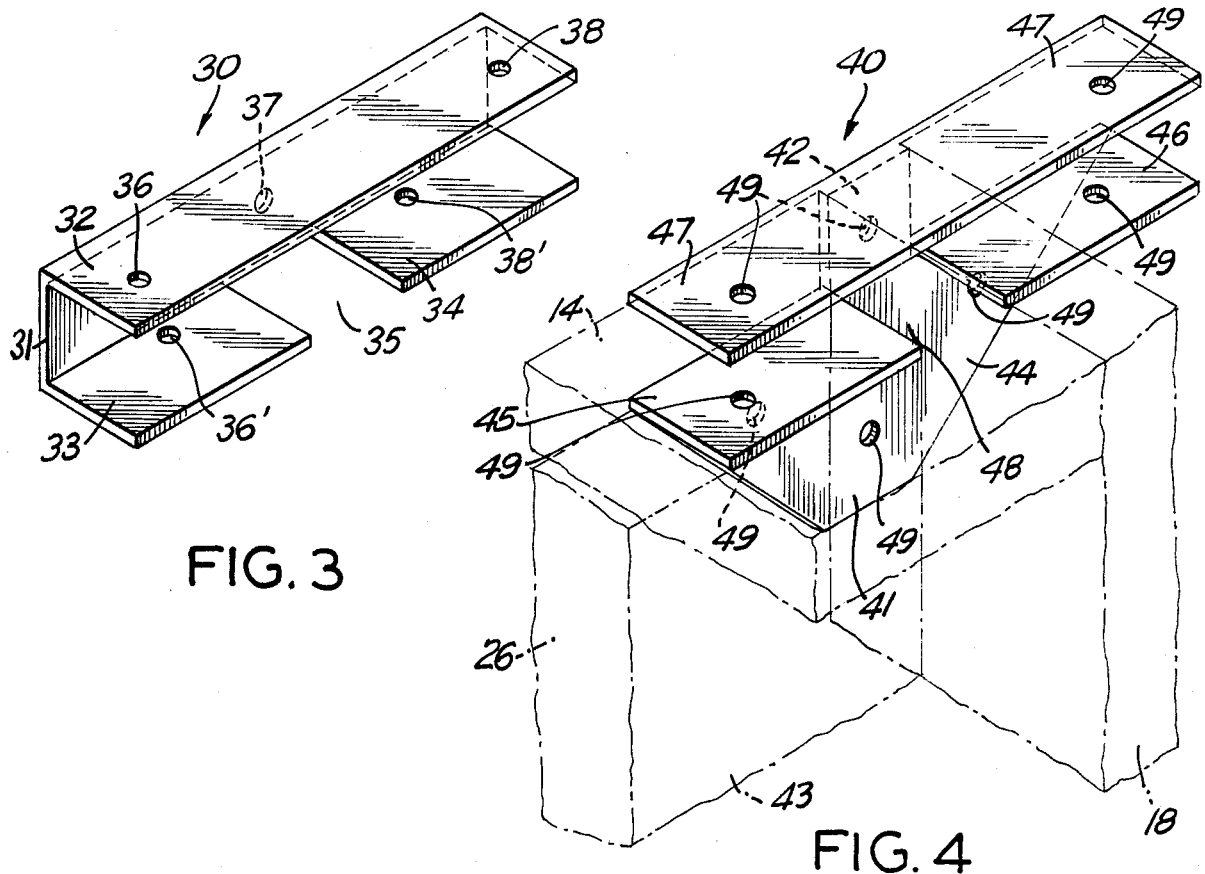
FIG. 3
FIG. 4
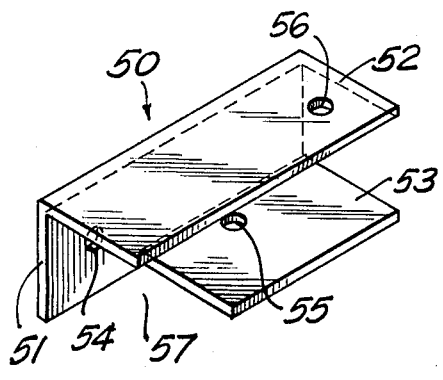
FIG. 5
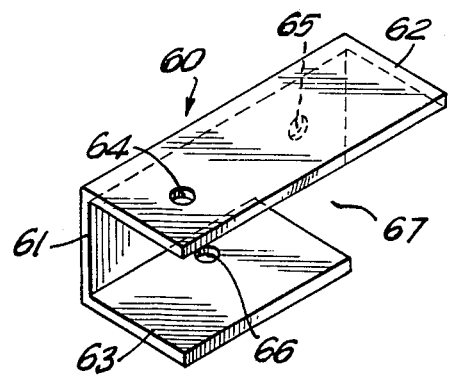
FIG. 6

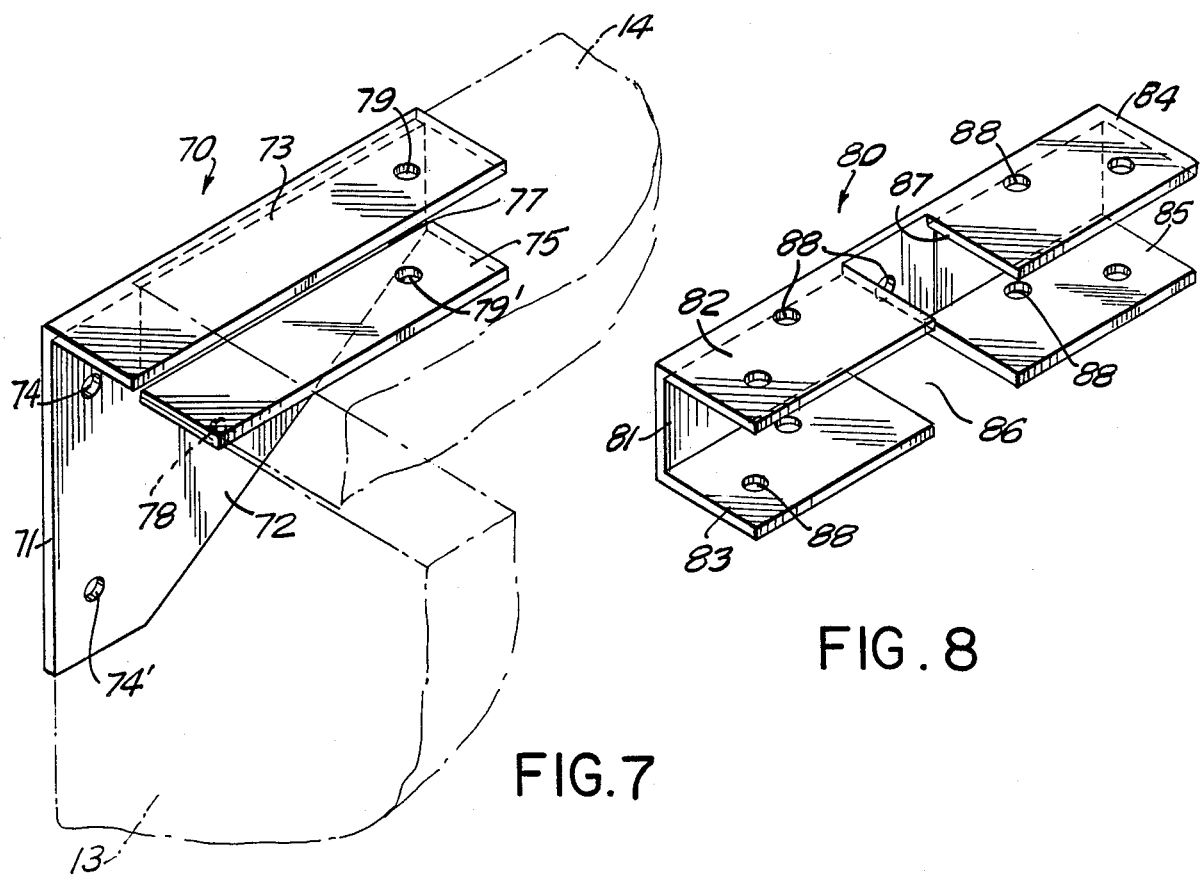
FIG. 7
FIG. 8
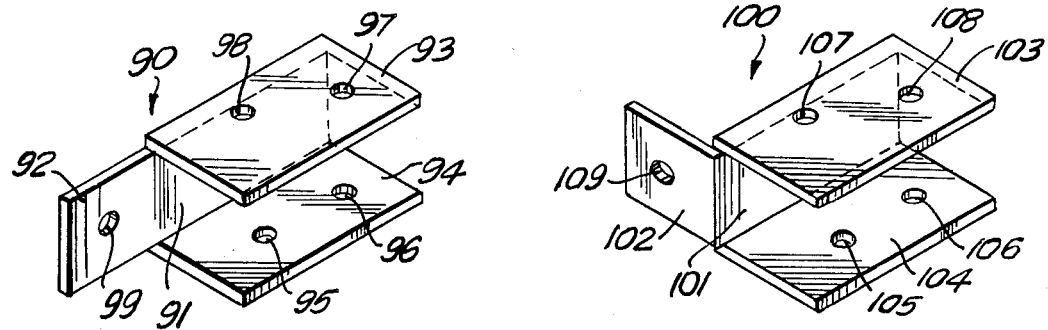
FIG. 9
FIG. 10

FURNITURE FASTENER ASSEMBLY

BACKGROUND OF THE INVENTION

There are a number of conventional ways to assemble furniture, such as by nailing, use of dowels, etc. With the increased cost of labor any system for easily and reliably assembling furniture is highly desireable.

This invention meets that need with a single set of fasteners, and other parts, made of metal or other rigid material, which may be used to assemble wood or the like into useful and attractive pieces of furniture.

SUMMARY OF THE INVENTION

The invention is a furniture fastening assembly comprising unique parts, preferably made of sheet metal, which are used to secure together the various parts of a piece of furniture.

The parts are economically made and easily used to assemble a piece of furniture which is attractive in appearance.

BRIEF DESCRIPTION OF THE DRAWINGS

In the accompanying drawings illustrating the invention:

FIG. 3 is a perspective view of one of the fasteners comprising the invention;

FIG. 4 is a perspective view of another fastener of the invention showing its use in relation to parts of furniture;

FIGS. 5 and 6 are perspective views of other fasteners of the invention;

FIG. 7 is a perspective view of another fastener of the invention showing its use in relation to parts of furniture;

FIGS. 8, 9 and 10 are perspective views of other fasteners of the invention;

DETAILED DESCRIPTION

The assembly of furniture fasteners comprising this invention is shown in FIGS. 1 through 14.

Figure 1:
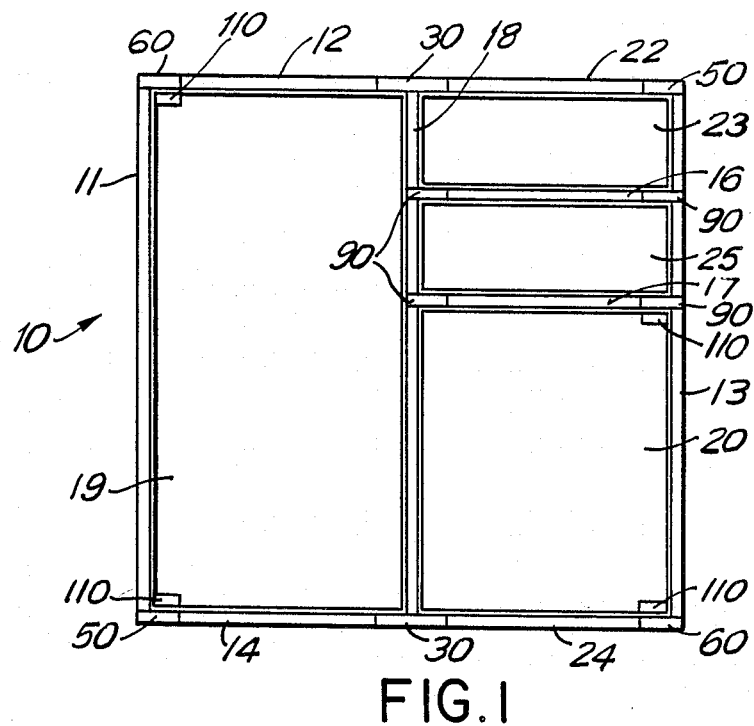
FIG. 1 is the front of a bureau which utilizes the fastener system of this invention.
Figure 2:
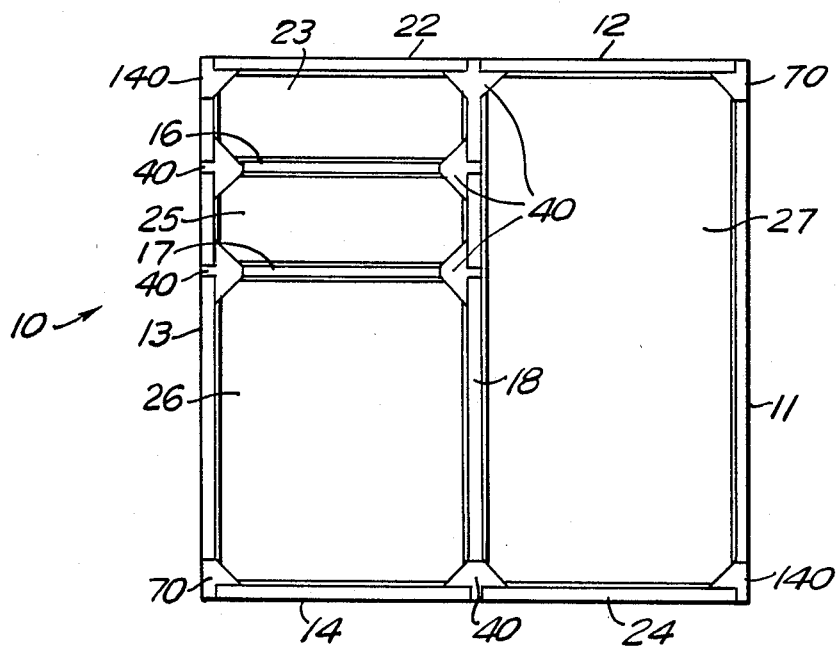
FIG. 2 is the back of the bureau.

In FIG. 1 is shown the front of a bureau using the fasteners of this invention, and in FIG. 2 is shown the back of the bureau. Referring to FIG. 1, 10 denotes the bureau, 11 and 13 are its sides and left section 12 and right section 22 form the top and left section 14 and right section 24 form the bottom. The bureau has two doors, one of which 19 is on the left (FIG. 1) and the other 20 is on the right. Side wall 11 is joined at the bottom front to the left front end of bottom 14 by fastener 50, which is shown in detail in FIG. 5.

Referring to FIG. 5, the fastener 50 has a first rectangular flange 52 which is integrally connected with a rectangular web 51 on one of its sides. On the other of its sides a smaller flange 53 is integrally connected to web 51. The fastener therefore has a U-shaped cross-section as shown in FIG. 5 and the flange 53 defines a cut-out portion designated with the reference 57 in FIG. 5.

Referring to FIG. 1 (bottom left) the only portion of fastener 50 which is visible is web 51 which is been rotated around its long axis from the position shown in FIG. 5. It is fastened to the bottom of side 11, which occupies cut-out portion 57 and rests on the inside of flange 52, by a screw (not shown) through the aperture 54 in web 51. Flange 52 is similarly fastened to the left underside of bottom section 14 by a screw (not shown) through hole 56 in flange 52. The end of the front left side of bottom 14 therefore abuts the inside of the bottom front of side 11. Those portions of side 11 and bottom 14 are therefore securely and easily fastened at that location by fastener 50.

Referring to FIG. 1, another identical fastener 50 (rotated around the short axis of web 51) secures the upper front end of side 13 to the right front end of top 22 in an identical manner.

A fastener 60 which is shown in FIG. 6, and has a web 61, flanges 62 and 63, holes 64 and 65 and a cut-out portion 67, is identical to fastener 50 but has a different hand. Such a fastener is used to fasten the upper front end of side 11 to the left front end of top 12 in the manner previously described for fastener 50. A fastener 60 is also used to fasten in like manner the bottom front end of side 13 to the right front end of bottom 24.

As shown in FIG. 1 inner upright wall 18 is fastened at its front bottom by fastener 30. Fastener 30 shown in detail in FIG. 3 has a web 31, flanges 32 and 33 and 34. Flange 32 is integrated with web 31 and extends along the length of one side of it. Flanges 33 and 34 are integrated with web 31 at its opposite ends, as shown in FIG. 3, and those flanges 33 and 34 define a cut-out portion 35. When fastener 30 is rotated (180° about the long axis of web 31) and is used to secure the bottom front end of inner wall 18 that end passes through cut-out portion 35 and rests on the inside of flange 32 and is fastened by a screw (not shown) through hole 37 in web 31 (which is seen in FIG. 1). The right front end of bottom 14 is secured to fastener 30 by screws (not shown) through holes 36 and 36' in flanges 32 and 33 where it abuts the left side of wall 18 at its bottom front, and the left front end of the bottom 24 is attached to fastener 30 by screws (not shown) through holes 38 and 38' in flanges 32 and 34 where it abuts the right side of wall 18 at its bottom front. Fastener 30 thus easily secures wall 18 to bottom sections 14 and 24 at those points.

Another fastener 30 (in a position with flange 32 above the other flanges and with web 31 shown in FIG. 1) secures the top front of wall 18 to the right front of top 12 and to the left front of top 11 in an identical manner.

Fastener 90 shown in FIG. 9 has a web 91 and two equal integrated flanges 93 and 94. The web 91 has an extended tab portion 92. The U-shaped fastener 90 has milled holes 95 and 98 adapted to receive a cylindrical projection 115 of door bracket 110 described below.

Referring to FIG. 1, a fastener 90 secures each end of shelf 16 and shelf 17. Shelf 16 at its left front end is secured to fastener 90 by screws (not shown) through holes 96 and 97 and the tab 92 is secured to inner wall 18 by a screw (not shown) through hole 99. The other right front end of shelf 16 is secured to wall 13 in an identical manner. Shelf 17 by use of a fastener 90 at each of its front ends is secured to wall 18 and wall 13 in identical manner. Drawers 23 and 25 (FIG. 1) are located in the respective spaces defined by top 22 and shelf 16 and shelf 17.

Figure 11:
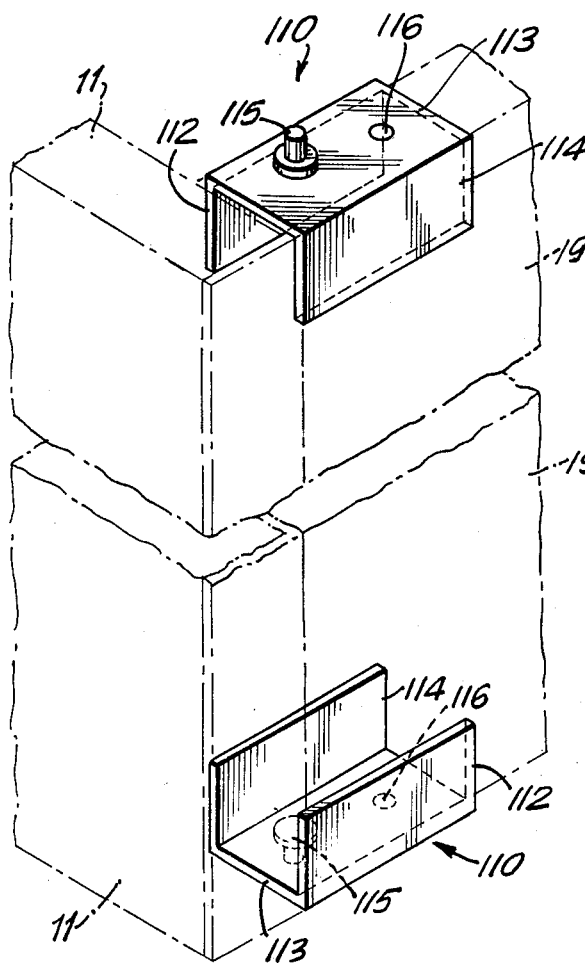
FIG. 11 is a perspective view in two positions of a part of the invention used on a door of a piece of furniture.
Figure 12:
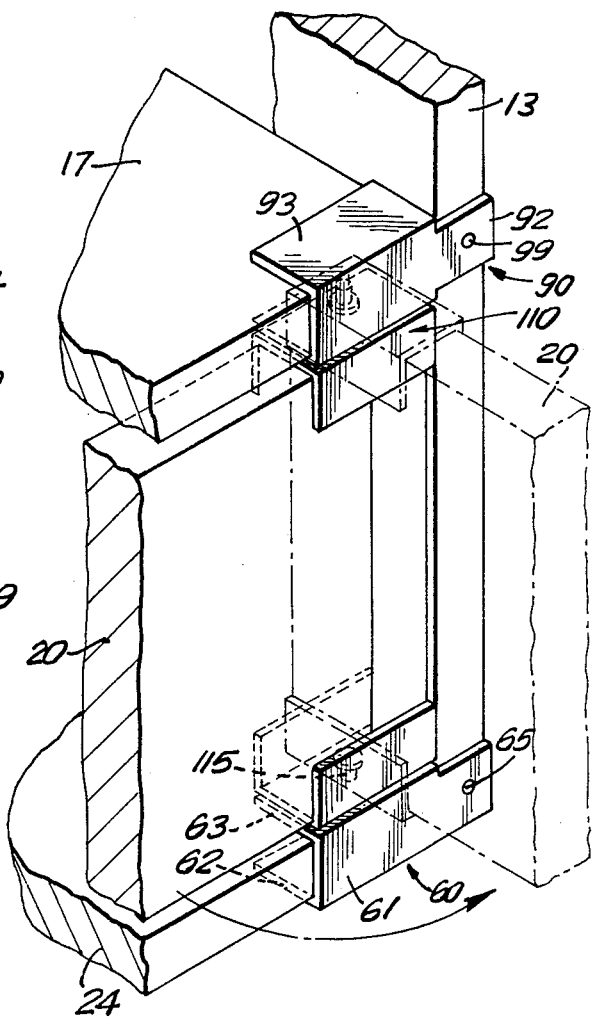
FIG. 12 is the part of FIG. 11 shown in perspective in relation to other parts of the invention.
Figure 13:
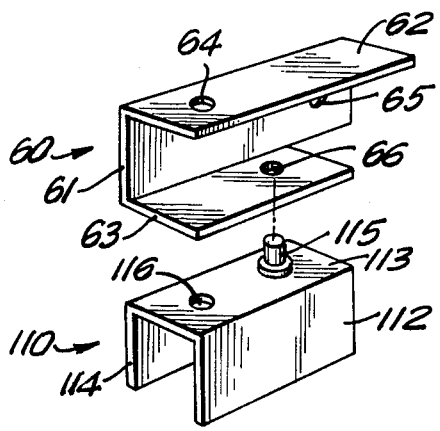
FIG. 13 shows in perspective the parts of FIGS. 6 and 11 and the adaption of them for use together.

A door 20 is located immediately above bottom 24 enclosing the space defined by it and shelf 17. The door 20 at its bottom right corner is supported by fastener 60 and door bracket 110 as shown in FIG. 12 (bottom). Door bracket 110 (FIGS. 11 and 13), composed of a web 113 and flanges 112 and 114, has a U-shaped cross-section. A screw (not shown) through hole 116 secures it to door 20 at its bottom right corner. Cylindrical projection 115 of door bracket 110 fits and rotates in milled hole 66 of fastener 60 (see FIG. 13 in which the parts 60 and 110 are inverted from the position shown in FIG. 12). Another door bracket 110 is secured to the top right corner of door 20 by a screw (not shown) through the hole 116 thus securing it to door 20 as shown in FIG. 12 (top). The cylindrical projection 115 of door bracket 110 fits and rotates in hole 95 of fastener 90. As shown in FIG. 12 (in perspective not to scale) door 20 may be opened and closed (and fixed in a closed position by means not shown) by rotation of each respective cylindrical projection 115 of door bracket 110 in milled hole 66 of fastener 60 and milled hole 95 of fastener 90.

In identical manner door 19 (left, FIG. 1) is located and secured in the space defined by top 12 and bottom 14 and held at its top left corner by the combination of a fastener 60 and a door bracket 110 and at its bottom left corner by a door bracket 110 and a fastener 50 (FIG. 5). The attachment of door brackets 110 to door 19 is shown in FIG. 11. The door may be opened and closed (and held by means not shown) and when moved, projections 115 of door brackets 110 bear in respective milled holes 66 and 55 of fasteners 60 and 50.

Referring to FIG. 2, the back of the bureau has sides 11 and 13, inner wall 18 and tops 22 and 12 and bottoms 14 and 24. The rear bottom corner of side 13 is fastened to the left, rear corner of bottom 14 by use of a fastener 70. A fastener 70 is shown in FIG. 7 in inverted position from that of FIG. 2. The fastener 70 has a triangular portion 72 integrated on one leg in the same plane with a longer rectangular portion 71 and on the other leg with a rectangular flange 75 at a right angle. At the upper end of portion 71 it is integrated with a rectangular flange 73, larger than 75, parallel to it and extending in the same direction. As shown in FIG. 7 one end of flange 73 terminates at the edge of portion 71 and the other end terminates directly above the end of flange 75 removed from portion 71. The flanges 73 and 75 define a rectangular cut-out portion 77 which extends the length of flange 75. Side 13 is secured to portion 71 by screws (not shown) through holes 74 and 74'. Bottom 14 is secured to flange 73 on its bottom by a screw (not shown) through hole 79 and on its top to flange 75 by a screw (not shown) through hole 79'. Side 13 (as shown in FIG. 7) extends to and rests on the inner face of flange 73 and the left end of bottom 14 abuts the inside of side 13. Back panel 26 (FIG. 2) is attached to fastener 70 by a screw (not shown) through hole 78 in portion 72.

A fastener 40 (shown in FIG. 4 in inverted form from FIG. 2) secures the right rear corner of bottom 14 to the bottom rear corner of inner wall 18. The fastener 40 (see FIG. 4) has a rectangular web 41 integrally attached to triangular portions 42 and 43 on its respective sides. Integrally attached above web 41 is a square tab 42 to which is integrally attached at a right angle a rectangular flange extending to the opposite ends of the triangular portions 43 and 44. Flange 45 is integrally attached (see FIG. 4) at a right angle to the upper leg of portion 43 and flange 46 is attached to the upper leg of triangular portion 44 in similar fashion. The flanges 45 and 46 define a cut-out portion 48 through which a board may pass. Holes in each of portions 41, 42, 43, 44, 45, 46 and 47 are referred to generally by the reference 49 (as shown in FIG. 4). Inner wall 18 is secured to fastener 40 by screws (not shown) through holes 49 in portions 41 and 42. Bottom 14 is secured to fastener 40 by screws (not shown) through the holes 49 in flange 45 and the adjacent part of flange 47, and abuts one side of wall 18. Bottom 24 is secured to fastener 40 by screws (not shown) through holes 49 in flange 46 and the adjacent part of flange 47 and abuts the other side of wall 18.

The distance therefore between flanges 45 and 47 is adapted to the thickness of the board to which it is secured, and the cut-out portion 48 is adapted to the size of the wall passing through, on the order of an inch. The flange 42 may, of course, be longer along the edge of flange 47 but is preferably only as long as the thickness of the board, such as wall 18, which it covers so as to give a pleasing esthetic appearance. The shape of the triangular portions 43 and 44 has also been chosen, in part, for esthetic reasons. It is also a convenient and economical shape to integrate with other parts of the fastener 40.

As shown in FIG. 2, a back panel 26 is attached at its lower right corner to fastener 40 by a screw (not shown) through the hole 49 in triangular portion 43. Similarly back panel 27 is attached at its lower left corner to fastener by a screw (not shown) through hole 49 in triangular portion 44.

Identical fasteners shown as 40 in FIG. 2 are used to secure wall 18 to the right rear corner of shelf 17 and shelf 16, as well as side 13 to the left rear corners of shelves 16 and 17. A fastener 40 in identical fashion secures the top of wall 18 to the right rear corner of top 22 and the left rear corner of top 12. In the manner previously described the upper left and right corners of back panel 26 are attached to fasteners 40 as shown in FIG. 2.

Figure 14:
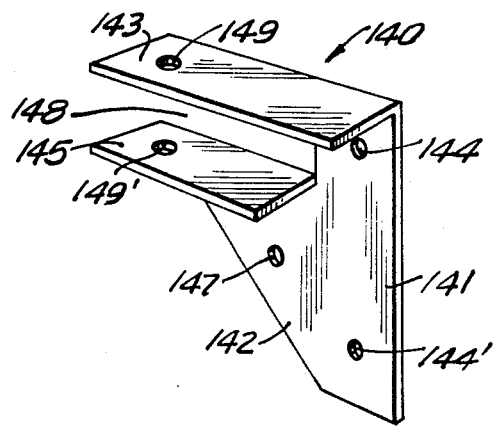
FIG. 14 shows in perspective another part of the invention.

A fastener 140 (FIG. 14) is identical to fastener 70 except that it has a different hand (compare FIGS. 7 and 14).

It is used in an identical manner to fasten the right rear corner of bottom 24, and the bottom rear corner of side 11, to it thereby forming a secure attachment of side 11 and bottom 24 at that point. Back panel 27 is attached to fastener 140 by a screw (not shown) through hole 147 (FIG. 14).

Another fastener 70 secures the right rear corner of top 12 to the upper rear corner of side 11. Back panel 27 is secured at its top right corner by that fastener 70 (by a screw through hole 78) and at its top left corner to the fastener 40 (by a screw through hole 49 in portion 44).

Another fastener 140 in identical fashion secures the left rear of top 22 to the upper rear of side 13. That fastener also secures the upper left corner of back panel 23 in the manner previously described, and that back panel 23 is attached respectively at its top right, lower right and lower left to fasteners 40 in an identical manner through a hole in the abutting triangular portions of fasteners 40.

Back panel 25 is identically attached between shelves 16 and 17 by use of fasteners 40 as shown in FIG. 2.

The fastener shown in FIG. 8 is identical to that shown in FIG. 3 except that it has a second cut-out portion 87 disposed immediately above cut-out portion 86 giving separate flanges 82 and 84 disposed above flanges 83 and 85, all integrally attached to web 81. The center of the web has an aperture to receive a screw to fasten it to a board passing through both cut-out portions 86 and 87, and each of the flanges 82 and 83 has an aperture 88 to receive a screw to fasten them to a board passing between them and abutting one side of the board passing through those cut-out portions. Similarly, flanges 84 and 85 each have an aperture (referred to generally as 88) to receive a screw to fasten them to a board passing between them and abutting the other side of the board through the cut-out portions. Fastener 80 therefore may be used to form a secure joint between a vertical board passing through those cut-out portions and two horizontal boards secured to the respective pairs of flanges and abutting the vertical board on each side.

The fastener 100 shown in FIG. 10 is identical to fastener 90 except that the tab portion 102 is at right angles to web 101 and extends away from flanges 103 and 104. As shown in FIG. 10 fastener 100 has an aperture 109 in tab 102 to receive a screw and fasten it to a board, flange 104 has an aperture 106, and flange 103 has an aperture 108, to secure those flanges to a board. Flange 103 has a milled hole 107 and flange 104 has a milled hole 105, each adapted to receive a cylindrical projection. Fastener 100, in conjunction with door bracket 110, therefore may be used to recess a door.

The fasteners and door bracket comprising this invention are preferably made of sheet metal having a thickness of about one-sixteenth of an inch or less sufficient to give rigidity to the fasteners. The distance between flanges, such as flanges 62 and 63 in fastener 60, is, as evident, sized to accommodate a standard board, for example, one having a one-inch nominal thickness. Cut-out portion 67 in fastener 60 is similarly sized to cover the edge of a one-inch board. Of course, such sizes may be varied to accommodate other board thicknesses. The other parts of the invention are similarly sized.

The fasteners also may be made of plastic or other material if sufficiently rigid.

The fasteners may be painted any color to lend an attractive appearance to the furniture piece in which they are used, or color may be incorporated in the metal or the material from which the fasteners are made.

The fasteners of this invention are easily and economically made and easily and economically used to assemble a piece of furniture, and the resulting furniture is attractive in appearance.

We claim:

1. A fastener assembly for fastening together parts of furniture, comprising in combination:

A. a front corner fastener means comprising a rectangular web, a first rectangular means flange integrally attached at a right angle along one entire side of the web; a second rectangular flange integrally attached at a right angle along only a part of the other side of the web; a first end of the second flange beginning at one end of the web and the other end of the second flange terminating before the other end of the web; the web and flanges having a U-shaped cross-section, the distance between the other end of the second flange and the other end of the web defining a cut-out portion and having a size sufficient to cover the thickness of a board abutting the web at that other end; an aperture in that other end of the web to receive a screw to fasten the web to a first board at one corner thereof; an aperture in the first flange to receive a screw to fasten a second board to it; the end of the second board abutting the side of the first board; and B. a rear corner fastener means comprising a rectangular web, triangular portion integrally attached to the web in the same plane as the web beginning at one end of the web and terminating before the other end of the web; the triangular portion having a leg extending at a right angle away from the web; a first rectangular flange integrally attached to the leg at a right angle to it; a second rectangular flange integrally attached to the other end of the web at a right angle to it and extending in the same direction as the first rectangular flange; the web having an aperture at each end to receive screws to fasten it to the first board along its inner face and abutting the second rectangular flange; and an aperture in each of the first and second rectangular flanges to receive screws to fasten them to the second board passing between them and abutting the side of the first board.

2. The fastener assembly of claim 1, further comprising:

C. a front wall fastener means comprising:
   a rectangular web, a first rectangular flange integrally attached at a right angle along one entire side of the web; second and third rectangular flanges integrally attached at a right angle along a part of the other side of the web and extending in the same direction as the first flange; the second flange beginning at one end of the web and the third flange beginning at the other end of the web; the second and third flanges having their other ends separated from each other and defining a cut-out portion of a size sufficient to pass a board between them; an aperture in the middle of the web to receive a screw to fasten it to a third board; an aperture in the first flange and an aperture in the second flange to receive screws to fasten the second board to them and abut one side of the third board, and an aperture in the third flange and another aperture in the first flange to receive screws to fasten a fourth board to them and abut the other side of the third board; and D. a rear wall fastener means comprising:
   a rectangular web having integrally attached along one side a first triangular portion and along the other side a second triangular portion; each triangular portion having a leg extending at a right angle away from the web and in line with one end of the web, a rectangular tab portion integrally attached to that end of the web and in its plane; a first rectangular flange integrally attached to said leg of the first triangular portion at a right angle to it; a second rectangular flange integrally attached to said leg of the second triangular portion at a right angle to it; the two flanges extending in the same direction; a third rectangular flange integrally attached at a right angle to the end of the tab portion and extending in the same direction as the two flanges; the ends of the third rectangular flange extending to the ends of the legs of those triangular portions; an aperture in the tab portion to receive a screw to fasten to it the third board passing between the first and second rectangular flanges; an aperture at one end of the third rectangular flange; and an aperture in the first rectangular flange to receive screws to fasten to them the second board passing between them and abutting one side of the third board, and an aperture at the other end of the third rectangular flange and an aperture in the second rectangular flange to receive screws to fasten them to the fourth board passing them and abutting the other side of the third board; and an aperture in the first triangular flange to receive a screw to fasten a first panel to it and an aperture in the second triangular flange to receive a screw to fasten a second panel to it.

3. The fastener assembly of claim 1, further comprising means for attaching a door to the assembly including:

(1) a U-shaped fastener comprising:
a rectangular web having integrally attached along its sides at a right angle thereto, a first rectangular flange and a second rectangular flange respectively; a tab portion integrally attached at one end of the web, the web and flanges having a U-shaped cross-section, the distance between the flanges being sufficient to receive a board therebetween; the length of the tab portion being sufficient to cover the thickness of a board; apertures in each of the flanges to receive a screw and fasten the flanges to a board between them terminating at the ends of the flanges adjacent the tab portion; an aperture in the tab portion to receive a screw to fasten it to another board adjacent those ends of the flanges, and an aperture in one of the flanges adapted to receive a cylindrical projection; and (2) a bracket comprising a rectangular web having integrally attached along its sides at a right angle thereto a first rectangular flange and a second rectangular flange respectively; the web and flanges having a U-shaped cross-section, the distance between the flanges being sufficient to receive a board therebetween; an aperture in the web to receive a screw to fasten it to the edge of a board forming a door; and a cylindrical projection on the side of the web away from the flanges, to be received in said aperture of one of the flanges of the U-shaped fastener.

4. The fastener assembly of claim 2, further comprising means for attaching a door to the assembly, including:

(1) a U-shaped fastener comprising a rectangular web having integrally attached along its sides at a right angle thereto, a first rectangular flange and a second rectangular flange respectively; a tab portion integrally attached at one end of the web; the web and flanges having a U-shaped cross-section; the distance between the flanges being sufficient to receive a board therebetween; the length of the tab portion being sufficient to cover the thickness of a board; apertures in each of the flanges to receive a screw and fasten the flanges to a board between them terminating at the ends of the flanges adjacent the tab portion; an aperture in the tab portion to receive a screw to fasten it to another board adjacent those ends of the flanges; and an aperture in one of the flanges adapted to receive a cylindrical projection; and (2) a bracket comprising a rectangular web having integrally attached along its sides at a right angle thereto a first rectangular flange and a second rectangular flange respectively, the web and flanges having a U-shaped cross-section, the distance between the flanges being sufficient to receive a board therebetween; an aperture in the web to receive a screw to fasten it to the edge of a board forming a door; and a cylindrical projection on the side of the web away from the flanges to be received in said aperture of one of the flanges of the U-shaped fastener.

5. A piece of furniture incorporating the assembly of claim 1.

6. A piece of furniture incorporating the assembly of claim 2.

7. A piece of furniture incorporating the assembly of claim 3.

8. A piece of furniture incorporating the assembly of claim 4.

* * * * *